United States Patent
Shade et al.

(10) Patent No.: US 6,985,146 B2
(45) Date of Patent: Jan. 10, 2006

(54) COMPOSITE FONT EDITING DEVICE AND COMPUTER PROGRAM

(75) Inventors: Marilyn E. Shade, Menlo Park, CA (US); Margie E. Vogel, Seattle, WA (US); Nathaniel M. McCully, Seattle, WA (US)

(73) Assignee: Adobe System Incorporated, San Jose, CA (US)

( * ) Notice: Subject to any disclaimer, the term of this patent is extended or adjusted under 35 U.S.C. 154(b) by 254 days.

(21) Appl. No.: 09/963,876

(22) Filed: Sep. 25, 2001

(65) Prior Publication Data

US 2002/0085006 A1 Jul. 4, 2002

Related U.S. Application Data

(60) Provisional application No. 60/235,062, filed on Sep. 25, 2000.

(51) Int. Cl.
*G06T 11/00* (2006.01)

(52) U.S. Cl. .................................................. 345/467
(58) Field of Classification Search ................ 345/471, 345/472, 467, 948
See application file for complete search history.

(56) References Cited

U.S. PATENT DOCUMENTS

| | | | |
|---|---|---|---|
| 5,018,083 A | | 5/1991 | Watanabe et al. |
| 5,175,806 A | | 12/1992 | Muskovitz et al. |
| 5,287,443 A | | 2/1994 | Mameda et al. |
| 5,500,931 A | * | 3/1996 | Sonnenschein ............. 715/529 |
| 5,501,538 A | | 3/1996 | Sawada et al. |
| 5,548,700 A | | 8/1996 | Bagley et al. |
| 5,579,471 A | | 11/1996 | Barber et al. |
| 5,581,670 A | | 12/1996 | Bier et al. |
| 5,617,115 A | * | 4/1997 | Itoh et al. .................... 345/467 |
| 5,803,629 A | | 9/1998 | Neville et al. |
| 5,805,167 A | | 9/1998 | van Cruyningen |
| 6,088,520 A | | 7/2000 | Taoka et al. |
| 6,330,577 B1 | * | 12/2001 | Kim ............................ 715/542 |
| 6,359,630 B1 | | 3/2002 | Morse et al. |
| 6,426,751 B1 | * | 7/2002 | Patel et al. .................. 345/468 |
| 6,504,544 B1 | | 1/2003 | Hollingsworth et al. |
| 2001/0048764 A1 | | 12/2001 | Betrisey et al. |

FOREIGN PATENT DOCUMENTS

| | | |
|---|---|---|
| JP | 07-149005 | 6/1995 |
| JP | 10-069477 | 3/1998 |
| JP | 11-353491 | 12/1999 |
| JP | 2000-267645 | 9/2000 |
| JP | 2001-281835 | 10/2001 |
| JP | 2001-297077 | 10/2001 |
| JP | 2003-523015 | 7/2003 |

* cited by examiner

*Primary Examiner*—Jeffery Brier
*Assistant Examiner*—Javid Amini
(74) *Attorney, Agent, or Firm*—Fish & Richardson P.C.

(57) ABSTRACT

Methods and apparatus for composite font editing in a DTP system. A font file stores multiple different fonts. A composite font editor can select two or more different fonts to create a composite font. A composite font file stores the created composite font. The composite font editor can display a composite font dialog box on the screen of a display device. The composite font dialog box contains a sample window with sample text of the composite font. An icon is provided for controlling display/non-display of at least one reference line associated with the font of the sample text displayed in the sample window in response to a user input.

10 Claims, 6 Drawing Sheets

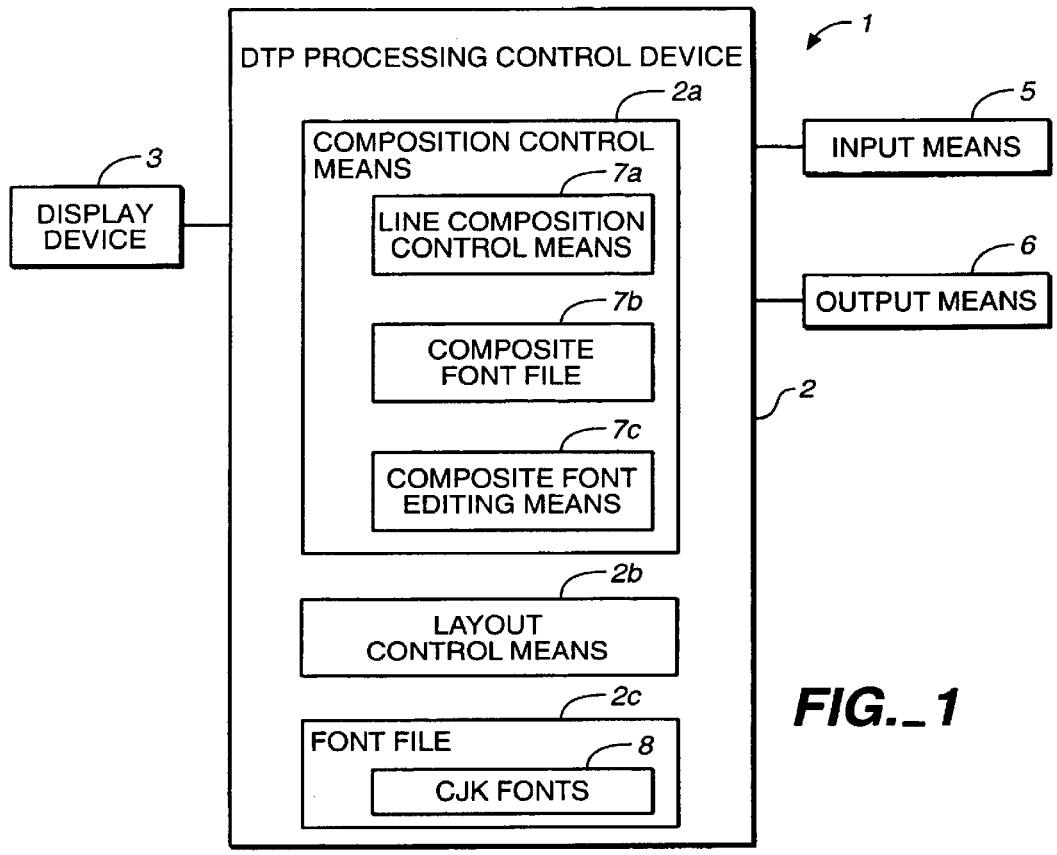
FIG._1
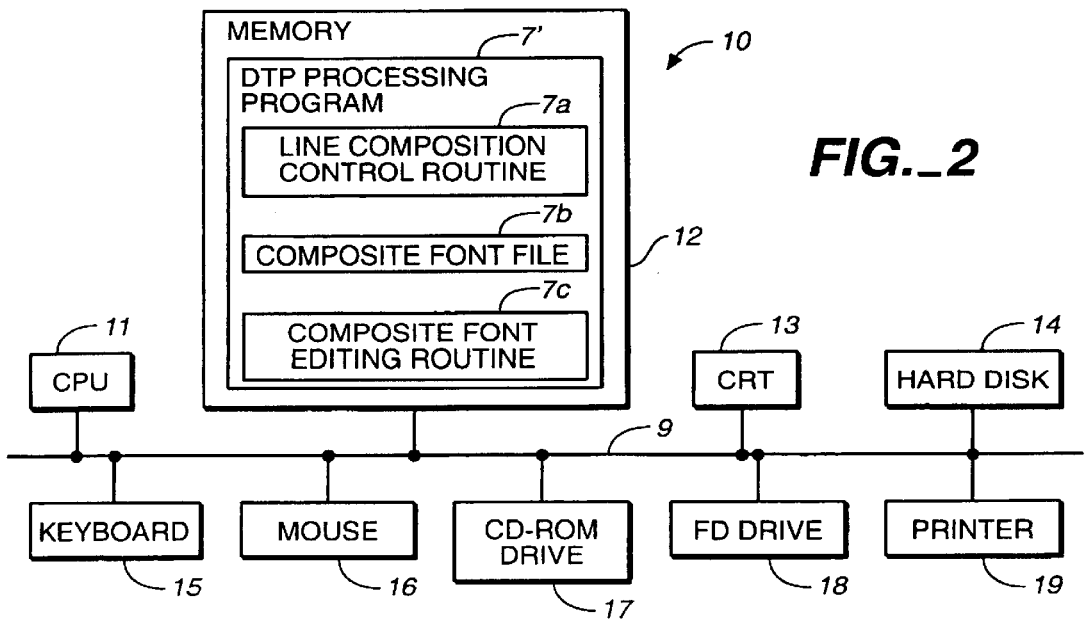
FIG._2

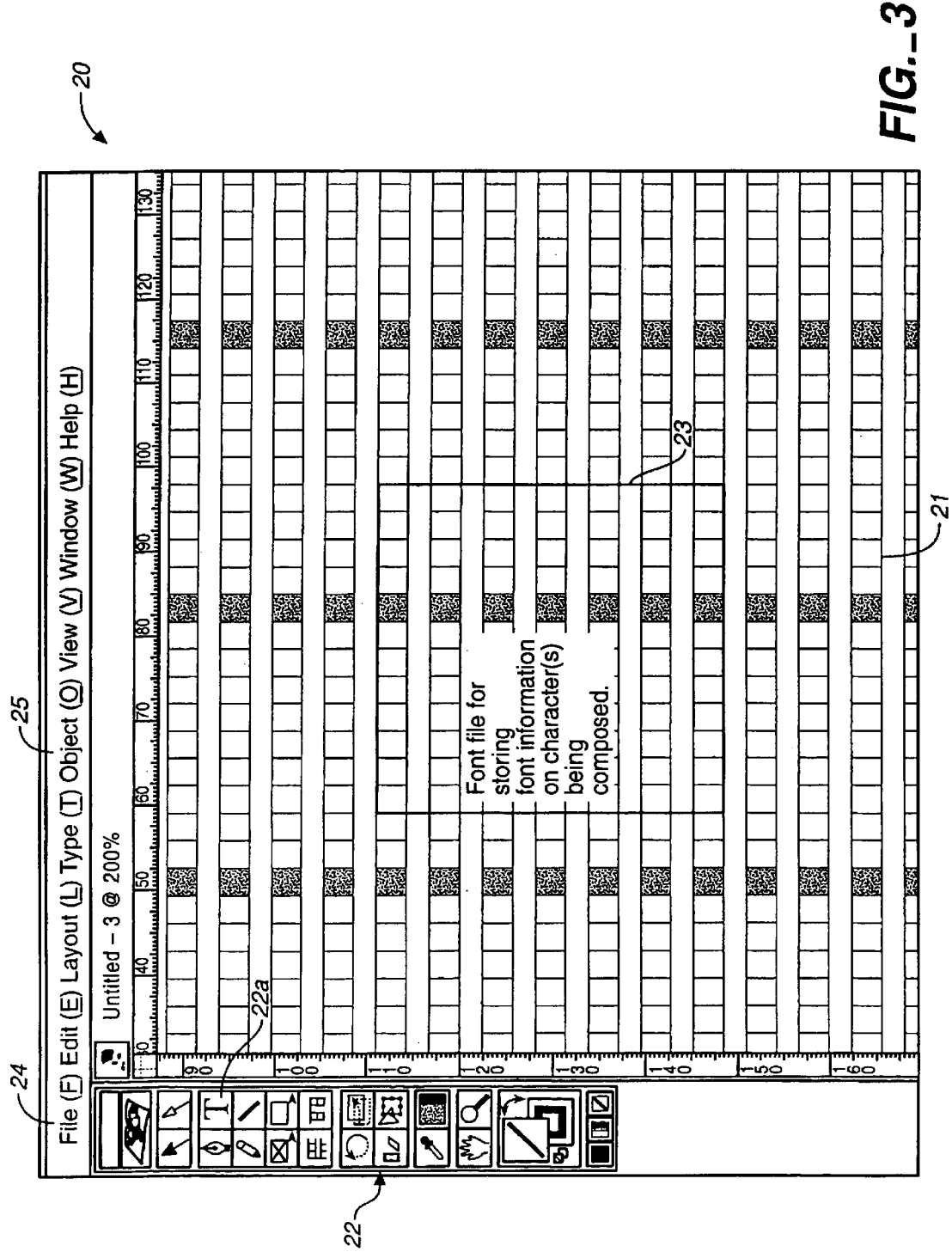
FIG._3

Composite Font Revision

Composite Font: NewFont

| | Font: | Size | Baseline | Vertical Percentage | Horizontal Percentage |
|---|---|---|---|---|---|
| Kanji: | Myocho | 100% | 0% | 100% | 100% |
| Kana: | Myocho | 100% | 0% | 100% | 100% |
| Full-width Puncuation Marks: | Myocho | 100% | 0% | 100% | 100% |
| Full-width Symbols: | Myocho | 100% | 0% | 100% | 100% |
| Half-width Western Alphabet: | Times New Ro...Regular | 200% | -10% | 100% | 100% |
| Half-width Numerals: | Times New Ro...Regular | 100% | 0% | 100% | 100% |

Unit: %

Times New ▼ Regular ▼ ◀200% ◀-10% ◀100% ◀100%

OK
Cancel
New
Save
Delete Font
Read
Special Characters
Hide Sample

Sample Revision

国LINE国Word国
character type国123国456国 $
1,789円国「合成フォントの見本」国国1
日2月3年4個5時6分7秒8人9件0
度1丁目2番地3階4号国ガーデンベル

Modify Sample

Zoom: 200% ▼

— 28a (character)
— 28b (character)
— 28c
— 28d
— 28e
— 28f
— 28g

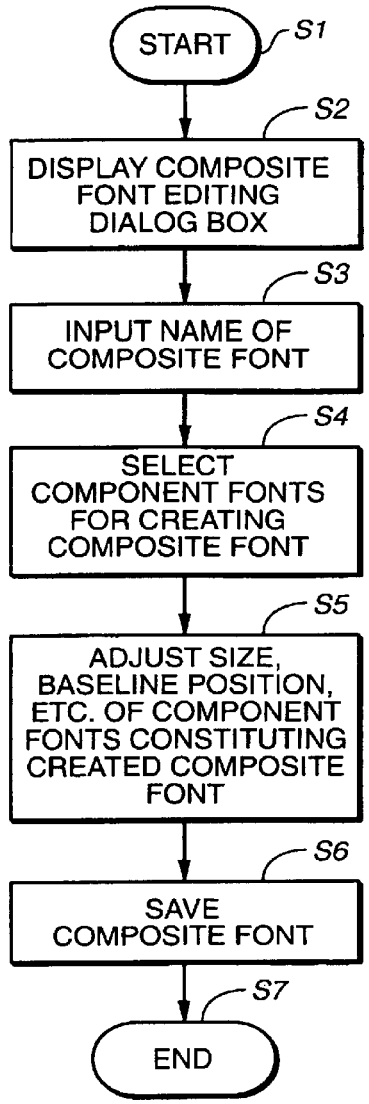
FIG._5A
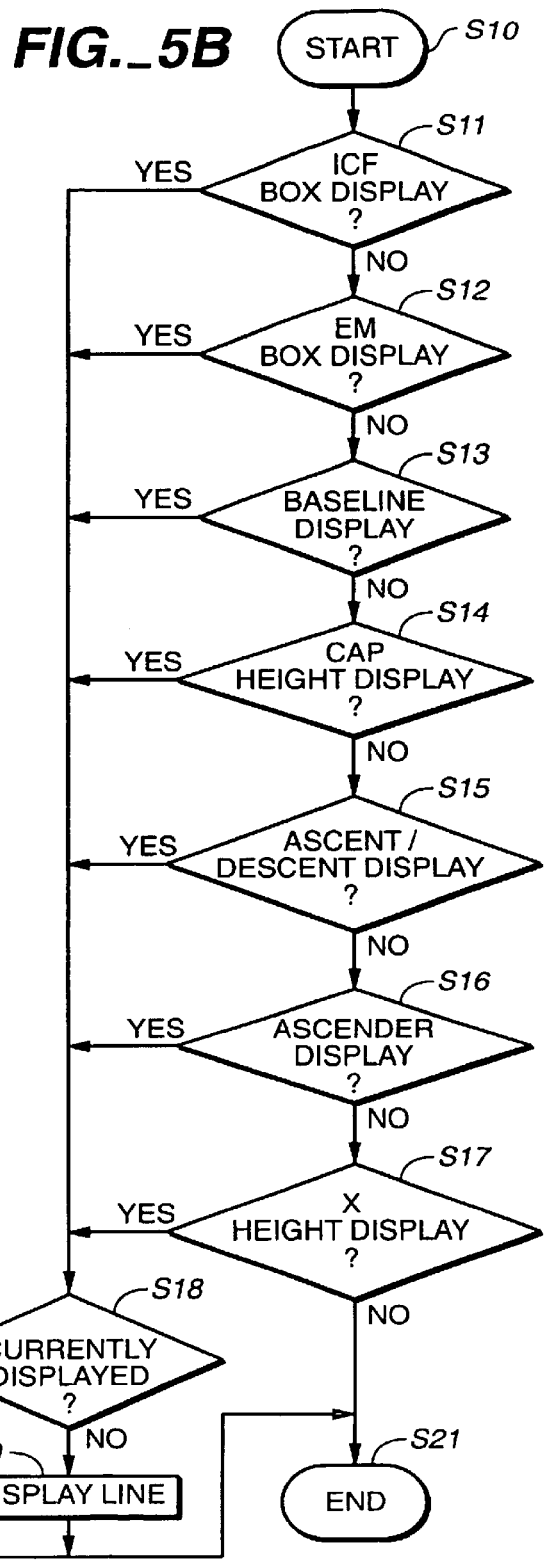
FIG._5B

FIG._6

Composite Font Revision

Composite Font: NewFont ▼

| Font: | | Size | Baseline | Vertical Percentage | Horizontal Percentage |
|---|---|---|---|---|---|
| Kanji: | Myocho | — | — | 100% | 100% |
| Kana: | Myocho | — | — | 100% | 100% |
| Full-width Puncuation Marks: | Myocho | 100% | 0% | 100% | 100% |
| Full-width Symbols: | Myocho | 100% | 0% | 100% | 100% |
| Half-width Western Alphabet: | Times New Ro...Regular | 200% | -10% | 100% | 100% |
| Half-width Numerals: | Times New Ro...Regular | 100% | 0% | 100% | 100% |

Unit: % ▼

Times New ▼ Regular ▼ ◄ 200% ◄ -10% ◄ 100% ◄ 100%

OK
Cancel
New
Save
Delete Font
Read
Special Characters
Hide Sample

Sample Revision

国<u>LINE</u>国<u>Word</u>国
<u>character</u>国<u>type</u>国123国456国$
1,789円国「合成フォントの見本」国国1
日2月3年4個5時6分7秒8人9件0
度1丁目2番地3階4号国ｸﾞｰﾃﾞﾝﾍﾞﾙ

Zoom: 200% ▼   Modify Sample

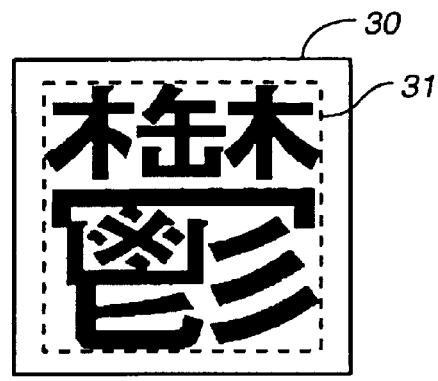
FIG._7A
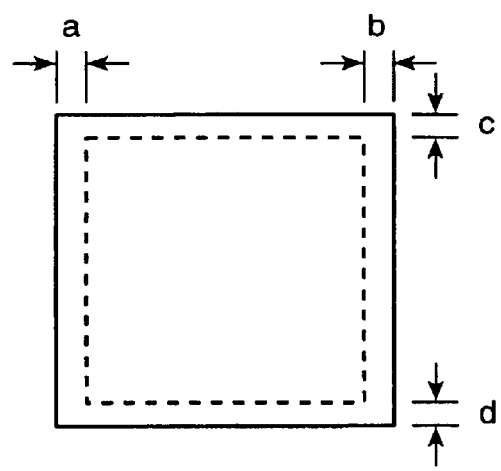
FIG._7B
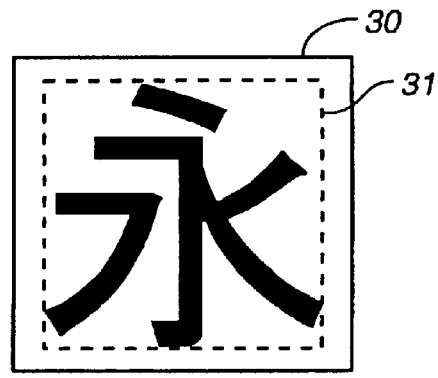
FIG._7C

COMPOSITE FONT EDITING DEVICE AND COMPUTER PROGRAM

CROSS-REFERENCE TO RELATED APPLICATIONS

This application claims the benefit of prior U.S. provisional application No. 60/235,062, filed Sep. 25, 2000.

BACKGROUND

This invention relates to desktop publishing (DTP). Many fonts are used in DTP. Sometimes, two or more fonts are selected from the available fonts to create and edit a composite font. For example, DTP based on the Japanese language uses different fonts: a first font used for kanji or kana and a second font used for Roman text or symbols. In such DTP systems, it is preferable to combine the first font and the second font to create a new composite font.

In conventional composite font editing for creating and editing a composite font a number of existing fonts can be selected to create a composite font. Sample text can be displayed with the created composite font in a sample window. However, for a composite font edited in this way, a user cannot accurately and easily determine whether or not the multiple component fonts of which the composite font is constituted are aligned as desired. Conventionally, a composite font editor is started and a composite font is created. The alignment status of the component fonts can be determined only after the composite font editor finishes and text is displayed using the created composite font in an electronic document.

For example, if a user wants to set the individual baselines of a first font and a second font so that they are offset from one another by exactly a desired size, the composite font editor must be started and the relative positional relationship between the fonts must be corrected. The composite font editor must then be stopped and the text displayed using the corrected composite font in an electronic document so that the user can judge the relative positional relationship of the first and second fonts. Also, if the corrected relative positional relationship is not satisfactory, a user must start the composite font editor again and make corrections, then stop the composite font editor and display text using the corrected composite font in an electronic document. This process is repeated until a satisfactory relative positional relationship has been obtained. Repeatedly starting and stopping the composite font editor in this manner makes the editing operation very troublesome and takes time.

SUMMARY

In general, in one aspect, this invention provides methods and apparatus, including computer program products, implementing and using techniques for composite font editing in a desktop publishing (DTP) system. A font file stores a different fonts, a composite font editor selects two or more fonts from the different fonts and creates a composite font, and a composite font file stores the created composite font. The composite font editor can display a composite font dialog box on the screen of a display device. The composite font dialog box displays a sample window containing sample text using the composite font. An icon is provided for controlling display/nondisplay of at least one reference line associated with the font of the sample text displayed in the sample window in response to a user input.

Advantageous implementations can include one or more of the following features. The reference line can have at least one line selected from: ICF box (average type face), embox (virtual body), baseline, cap height, ascent/descent, ascender, and X height. Each reference line can be displayed in a different color when several of the reference lines are displayed. The sample text is displayed in the sample window in a plurality of lines.

The invention can be implemented to realize one or more of the following advantages. A user may easily and quickly edit composite fonts. Selected reference lines for a plurality of fonts may be displayed in a window during editing of a composite font that is displayed in a sample window. The fonts can be displayed per user selection to provide visual feedback to the user. The ease of use for a user is improved. A composite font can be appropriately adjusted quickly without suspending the entire composite font editing operation.

The details of one or more implementations of the invention are set forth in the accompanying drawings and the description below. Other features, objects, and advantages of the invention will be apparent from the description and drawings, and from the claims.

DESCRIPTION OF DRAWINGS

FIG. 1 is a schematic block diagram showing a DTP system provided with a composite font editing function in accordance with the present invention.

FIG. 2 is a schematic block diagram showing a DTP system based on a general-purpose computer provided with a composite font editing function in accordance with the present invention.

FIG. 3 is a schematic drawing showing part of a screen during editing of an electronic document displayed on the screen of a CRT in a DTP system.

FIG. 4 is a schematic diagram showing a composite font editing dialog box in accordance with the present invention.

FIG. 5A is a flowchart showing a process for composite font editing in accordance with the present invention.

FIG. 5B is a flowchart showing a toggle process for controlling display/non-display of reference lines in the sample window of the composite font editing dialog box.

FIG. 6 is a schematic diagram showing baselines displayed in the sample window of the FIG. 4 dialog box.

FIGS. 7A–7C are schematic diagrams used to explain the process of calculating an ICF box.

Like reference symbols in the various drawings indicate like elements.

DETAILED DESCRIPTION

FIG. 1 shows an electronic composition DTP system 1, in accordance with one implementation of the present invention. The DTP system 1 includes a DTP processing control device 2 that can execute electronic composition such as layout and editing, and so on, a display device 3 that can display data being processed, an input device 5 with which a user can input various types of data such as control instructions, and an output device 6 for outputting processed data. The DTP processing control device 2 includes a composition controller 2a for controlling composition, a layout controller 2b for layout and editing, and a font file 2c storing font information that includes attributes of text to be output for display, printing, and so on. In FIG. 1, the font file 2c contains a CJK font 8, which is a font for ideographic characters such as Japanese, Chinese, Korean. The composition controller 2a includes a line composition controller 7a that arranges within one line characters that are being composed in electronic composition, a composite font editor 7c that creates composite fonts using a plurality of fonts selected from fonts stored in the font file 2c, and a composite font file 7b that stores the composite fonts created in this way.

The display device 3 can include various display devices such as a CRT, LCD, and the input device 5 can include a keyboard, a pointing device (mouse, track ball, track pointer, etc.), a scanner, a communication interface, and so on. The output device 6 can include a printer, an external memory device, and so on. The DTP processing control device 2 can include a processor or memory such as a CPU, or an electronic composition processing program that includes various program routines, such as a composition control routine, layout and editing routine that is loaded into memory and processed by a processor. The DTP processing control device 2 can also include in whole or in part hardware made into firmware.

FIG. 2 is a block diagram showing a DTP system 10 including a composite font editing function that is obtained by applying the present invention to a general-purpose computer system. The system 10 includes a CPU 11, a memory 12, a CRT 13, a hard disk 14, a keyboard 15, a mouse 16, a CD-ROM drive 17, a FD drive 18, and a printer 19, which are interlinked by a bus 9. The system 10 also includes a DTP processing program 7', which includes a line composition control routine 7a that is used in electronic composition, a composite font editing routine 7c that combines a plurality of fonts to create composite fonts and a composite font file 7b that stores the combined composite fonts. These components can be installed in the system 10, together with other electronic editing programs, for example, using the CD-ROM drive 17 or the FD drive 18, or can be downloaded through a communication circuit such as the Internet, and are stored on the hard disk 14, for example. In addition, a layout control routine or the font file 2c can also be stored on the hard disk 14. The DTP processing program 7' stored on the hard disk 14 can be started by a user operating the keyboard 15 or the mouse 16, which loads the DTP processing program 7' into the memory 12 as shown in FIG. 2. The loaded DTP processing program 7' exists in both the CPU 11 and the memory 12 and constitutes the DTP processing control device 2, and includes as a part thereof the composite font file 7b and the composite font editing routine 7c. According to one aspect of the present invention, a computer readable storage medium (for example, a CD-ROM, FD, tape, semiconductor memory, etc.) is provided, on which a composite font editing program is stored, the font editing program being operable to convert a general-purpose computer system to a DTP system provided with the inventive composite font editing function.

FIG. 3 shows a part 20 of a screen display of the display device 3 or CRT 13 during DTP processing in the DTP system 1 or 10 shown in FIG. 1 or FIG. 2. Specifically, FIG. 3 shows a situation in which "new" was selected in a pull-down menu obtained by clicking on "file (F)" 24 on the menu bar, a new electronic document having a page layout grid 21 was opened, a text tool 22a was selected in a tool box 22, a frame 23 for text alignment was demarcated and text including multiple characters was input in the frame 23.

The invention can provide a composite font editing function incorporated in a DTP processing system. A composite font editing routine can be started by selecting "composite font editing" in a pull-down menu displayed by clicking "format (T)" 25 in a menu bar on the screen of the CRT shown in FIG. 3. When a user inputs text including kanji and Roman text in the text frame 23 and the user wants the first font used for the kanji and the second font used for the Roman text to be different, it is preferable to create a composite font that combines the first font and the second font and to input text using the composite font. When a user selects "composite font editing," the composite font editing routine 7c is started (step S1) as shown in the flowchart in FIG. 5A, and a composite font editing dialog box is displayed (step S2) on the CRT screen, as shown in FIG. 4.

As shown in FIG. 4, most of the top half of the composite font editing dialog box is the composite font editing region, and most of the lower half is a sample window 27 for displaying sample text in a composite font. When the dialog box shown in FIG. 4 is displayed, a user first clicks with the mouse on the "new" button and then enters the file name of the composite font to be created (step S3 in FIG. 5A). In FIG. 4, the composite font file name is "NewFont." When the composite font is given a file name, fonts can be selected as components for the composite font. In FIG. 4, a maximum of six different fonts can be individually selected for the composite font: "kanji," "kana," "full-width punctuation," "full-width symbols," "half-width Roman text," and "half-width numerals" (step S4). A user selects any one of these six setting items with a mouse click (in FIG. 6, "half-width Roman text" is selected), and selects one of the files stored in the font file displayed in pull-down menu format in the list box beneath the "font" section. In FIG. 4 "Times New Roman" is selected, and as a result "Times New Roman" is shown selected in the "half-width Roman text" section.

Sample text can be displayed in the sample window 27 based on the composite font combined in this manner. Also, a user can select each component font of the composite font and modify the size, baseline position, vertical ratio and horizontal ratio (step S5) of the selected component font. In FIG. 4, the section for "half-width Roman text" is selected, the size is "200%," that is, the size has been doubled and the baseline position is "−10%," that is, it should be shifted downward 10% from the Times New Roman standard baseline position. Furthermore, in this implementation "kanji" is the font selected from among the component fonts of the composite font (in the implementation shown in FIG. 4, a maximum of six individual component fonts can be selected) as the base font in the composite font. The size and baseline position of the base font cannot be changed. When a base font is selected, the input windows for setting its size and baseline position are grayed out. On the other hand, the size and baseline position of component fonts other than the base font can be appropriately modified when they are selected. Therefore the size and baseline position of component fonts other than the base font can be set as values relative to the base font.

A composite font edited in this manner can be stored in the composite font file 7b by clicking the "save" button (step S6 in FIG. 5A) using the mouse. If the "OK" button is subsequently mouse clicked, the composite font editing dialog box of FIG. 4 is no longer displayed, and the composite font editing routine ends (step S7 in FIG. 5A). Composite fonts created in this way and stored in the composite font file 7b can be selected as fonts to use when a user inputs text in an electronic document. As described above, when a user wants to use a first font for kanji and a second font for Roman text, if a composite font that includes the first font and the second font is created in advance, and text is input into an electronic document using the composite font, the user does not have to select the first font when the input character class is kanji or select the second font when the character class to be input is in Roman text. Consequently, inputting text into an electronic document becomes much more efficient.

In the example shown in FIG. 4, Times New Roman is selected for half-width Roman text, its size is set as 200% and its baseline is set as −10%. MS Mincho, the font selected for kanji, is the base font, so Times New Roman is set to have a size twice that of MS Mincho, and its baseline position is set to be 10% below that of the MS Mincho baseline. In the sample window 27 in FIG. 4, only sample text based on the composite font is displayed. It is possible to accurately judge the relative positional relationships of each component font constituting the composite font in the sample window 27. In conventional DTP systems, it was necessary to stop the composite font editor, input text into an electronic document, display it on a CRT and judge the relative positional relationships between component fonts.

As shown in FIG. 4, icons 28*a* through 28*g* are provided in the composite font dialog box for several reference lines. Multiple reference lines are set in digital fonts, for example embox, ICF box, baseline, cap height, ascent, descent, ascender, X height, and so on. In FIG. 4, icon 28*a* controls display/nondisplay of the upper and lower reference lines of an ICF box, icon 28*b* controls display/nondisplay of the upper and lower reference lines of an embox, icon 28*c* controls display/nondisplay of the baseline, icon 28*d* controls display/nondisplay of the cap height, icon 28*e* controls display/nondisplay of the ascent/descent, icon 28*f* controls display/nondisplay of the descender, and icon 28*g* controls display/nondisplay of the X height. When a user clicks on any of these icons, the corresponding reference line is displayed in the sample window 27 in a preset color. Furthermore, in this implementation, the icon 28*a* for an ICF box is selected for display, so only the upper and lower reference lines of ICF boxes for kanji fonts are displayed across all the sample text.

In this implementation, each icon 28*a* through 28*g* is constructed for toggle operation, so when a user clicks on an icon, the corresponding reference line is displayed in the sample window in a specified color, and when the user next clicks on the same icon the corresponding reference line vanishes from the sample window. FIG. 5B shows a flowchart for an algorithm that displays or doesn't display in the sample window 27 reference lines corresponding to a user clicking on an icon. Suppose a user mouse clicks on the icon 28*c* in the dialog box in the state shown in FIG. 4 (step S10 in FIG. 5). When this happens, decision step S11 and step S12 in the flowchart of FIG. 5B are negative, but decision step S13 is positive. The flow shifts to decision step S18, where a decision is made as to whether or not the baseline is currently displayed in the sample window 27. Since the base line is not displayed in FIG. 4, the flow shifts to step S20 and the baseline is displayed in the sample window 27. As a result, the dialog box in FIG. 4 appears. In FIG. 4 a baseline for the sample text in the sample window is displayed. Also, the baseline for the Roman text font is set −10% relative to the kanji font, so the baseline for Roman text is shown positioned 10% below the baseline for kanji in FIG. 4.

The invention provides visual feedback regarding the reference line in the sample window, so a user can use the sample window to check on the relative positional relationships of the baselines of each component font of the composite font, and the difficulty of checking in the electronic document after stopping the composite font editor is eliminated. When the baseline position is changed, this is immediately reflected in visual feedback in the sample window. Therefore a user can immediately decide whether or not the position of a modified baseline is at the desired position in the sample window, and if it is not as desired, it is possible to change the baseline position again.

When the baseline position of half-width Roman text has been set at the desired position, a user once again clicks on baseline icon 28*c* (step S10 in FIG. 5B). Also in this case the decision steps S11 and S12 are negative, but decision step S13 is positive, and the flow shifts to decision step S18. The baseline is currently displayed in the sample window, so the result of decision step S18 is positive and the flow shifts to step S19. The baseline is not displayed in the sample window, and the processing ends (step S21).

The example above explained only baseline icon 28*c*, but the same processing is performed if a user clicks any of the other icons with the mouse. That is, when any of icons 28*a* through 28*g* is clicked on, the processing in FIG. 5B starts, and one of decision steps S11 through S17 is positive according to which icon is selected. If the corresponding reference line is displayed in the sample window it becomes not displayed, while if the reference line is not displayed it becomes displayed, for a toggle operation. For example, if all of icons 28*a* through 28*g* are clicked in numerical sequence, all of the corresponding reference lines will be simultaneously displayed in the sample window.

Furthermore, the embox used in the above example is an essentially square frame, vertically and horizontally demarcated using specific font dimensions (for example, point dimensions). Glyphs for Japanese text are usually arranged in an embox of this type. Therefore an embox is essentially identical to a virtual body. An embox is usually set in Japanese text fonts, but is sometimes not set in Roman text fonts. In such cases, an embox can be calculated from the Roman text font's bounding box information.

In addition, an ICF (Ideographic Character Face) box is a face for ideographic characters (also known as "average character face"). If a font has ICF box information, this information should be used, but if a font does not have any ICF box information the ICF box can be calculated by a number of methods. One method of calculating an ICF box shall be explained with reference to FIG. 7. As shown in FIG. 7A, "utsu" is selected as a first reference character, and its embox 30 and bounding box 31 are determined. In addition, as shown in FIG. 7C, "naga" is selected as a second reference character, and its embox 30 and bounding box 31 are determined. Next, as shown in FIG. 7B, the vertical and horizontal differences a, b, c, d, between the bounding box 31 and the embox 30 are determined for each reference character. These eight differences are added and the addition result is divided by 8 to determine the average value of the differences. If a new box is defined by positioning it inside the embox and separated from the embox exactly by the average difference value thus obtained, this box is the ICF box. Furthermore, the ICF box calculation method is not limited only to the method described above. An ICF box can be calculated using only one reference character, and can also be calculated using three or more reference characters. In addition, the reference characters described above are suitable reference characters, but are not limited to these; other characters may also be used as reference characters.

A number of implementations of the invention have been described. Nevertheless, it will be understood that various modifications may be made without departing from the spirit and scope of the invention. Accordingly, other implementations are within the scope of the following claims.

What is claimed is:

1. A composite font editing device used in a desktop publishing system, comprising:

a composite font editor operable to receive a user input specifying a user selection of two or more different fonts and to create a composite font from the two or more different fonts;

wherein the composite font editor is operable to display a composite font dialog box on the screen of a display device, the composite font dialog box displaying a sample window containing sample text using the composite font, and wherein an icon is provided for controlling display/non-display of at least one reference line associated with the composite font, the at least one reference line being a line drawn for each font of the composite font and the at least one reference line being positioned relative to the sample text displayed in the sample window.

2. The composite font editing device of claim 1, wherein the reference line has at least one line selected from: ICF box (average type face), em-box (virtual body), baseline, cap height, ascent, descent, ascender, and X height.

3. The composite font editing device of claim 2, wherein each reference line is displayed in a different color when more than one of the reference lines are displayed.

4. The composite font editing device of claim 1, wherein the sample text is displayed in the sample window in more than one line of text.

5. A computer program product, tangibly stored on a computer-readable medium, for composite font editing, comprising instructions operable to cause a programmable processor to:

display a composite font editing dialog box on the screen of a display device when started by a user;

receive a user input specifying a user selection of two or more different fonts, using the composite font editing dialog box;

create a composite font from the two or more different fonts;

use the created composite font to display sample text in a sample window; and display a reference line in the sample window in response to a user selection of a corresponding reference line icon provided in the composite font editing dialog box, the reference line being a line drawn for each font of the composite font and the at least one reference line being positioned relative to the sample text displayed in the sample window.

6. The computer program product of claim 5, wherein the reference line icon has at least one reference line icon selected from: ICF box (average type face), em-box (virtual body), baseline, cap height, ascent, descent, ascender, and X height.

7. The computer program product of claim 6, further operable to display each reference line in a different color when a plurality of the reference lines is displayed.

8. The computer program product of claim 5, further operable to display sample text in the sample window as a plurality of textual lines when the sample text includes a plurality of characters.

9. A composite font editing device used in a desktop publishing system, comprising:

a font file storing a plurality of different fonts; and a composite font editing means operable to receive a user input specifying a user selection of two or more fonts from the plurality of different fonts and to create a composite font from the two or more fonts;

wherein when the composite font editing means is started by user input, a composite font dialog box is displayed on the screen of a display device, the composite font dialog box being operable to display a sample window displaying sample text using the composite font, and an icon is provided for controlling display/non-display of at least one reference line, the at least one reference line being a line drawn for each font of the composite font and the at least one reference line being positioned relative to the sample text displayed in the sample window.

10. A computer readable recording medium storing a composite font editing program, for executing by computer in a desktop publishing system, comprising:

a procedure for displaying a composite font editing dialog box on a screen of a display device when started by a user;

a procedure for receiving a user input specifying a user selection of two or more different fonts using the composite font editing dialog box;

a procedure for creating a composite font from the two or more different fonts;

a procedure for using the created composite font to display sample text in a sample window; and a procedure for displaying a reference line in the sample window when a user selects corresponding reference line icon provided in the composite font editing dialog box, the at least one reference line being a line drawn for each font of the composite font and the at least one reference line being positioned relative to the sample text displayed in the sample window.

* * * * *

UNITED STATES PATENT AND TRADEMARK OFFICE
CERTIFICATE OF CORRECTION

PATENT NO. : 6,985,146 B2
DATED : January 10, 2006
INVENTOR(S) : Marilyn E. Shade, Margie E. Vogel and Nathaniel M. McCully It is certified that error appears in the above-identified patent and that said Letters Patent is hereby corrected as shown below:

Column 7,
Line 36, delete "fonts," and replace with -- fonts --;

Column 8,
Line 43, after "selects", insert -- a --.

Signed and Sealed this

Thirtieth Day of May, 2006

JON W. DUDAS
*Director of the United States Patent and Trademark Office*